United States Patent [19]

Sauer

[11] Patent Number: 4,962,892
[45] Date of Patent: Oct. 16, 1990

[54] MOBILE MATERIAL DISTRIBUTION APPARATUS

[75] Inventor: C. J. Sauer, Evansville, Ind.

[73] Assignee: Chem-Farm, Inc., Evansville, Ind.

[21] Appl. No.: 298,573

[22] Filed: Jan. 18, 1989

[51] Int. Cl.⁵ ............................................. B05B 1/20
[52] U.S. Cl. .................................... 239/722; 239/159;
239/167; 239/169; 239/176
[58] Field of Search ............... 239/159, 163, 166, 167,
239/176, 164, 723, 754, 722; 280/DIG. 6, 62,
47.34, 47.2

[56] References Cited

U.S. PATENT DOCUMENTS

| | | | |
|---|---|---|---|
| 2,638,730 | 5/1953 | Davidson | 239/754 |
| 3,423,027 | 1/1969 | Small et al. | 239/754 |
| 3,508,709 | 4/1970 | Small et al. | 239/754 |
| 3,726,481 | 4/1973 | Foster et al. | 239/175 |
| 4,011,994 | 3/1977 | Lenz | 239/754 |
| 4,531,350 | 7/1985 | Huthmacher | 280/47.2 |
| 4,569,486 | 2/1986 | Balmer | 239/166 |
| 4,624,602 | 11/1986 | Kieffer et al. | 239/172 |
| 4,793,559 | 12/1988 | Marlek | 239/166 |

*Primary Examiner*—Andres Kashnikow
*Assistant Examiner*—Christopher G. Trainor
*Attorney, Agent, or Firm*—Richard Bushnell

[57] ABSTRACT

A mobile hand-pushed boom type spray apparatus which includes a three-wheeled support, having one wheel which is positionable to select and maintain a constant spray boom height above a surface, thereby increasing the precision of the spray application and improving the ability to track a given path.

9 Claims, 4 Drawing Sheets

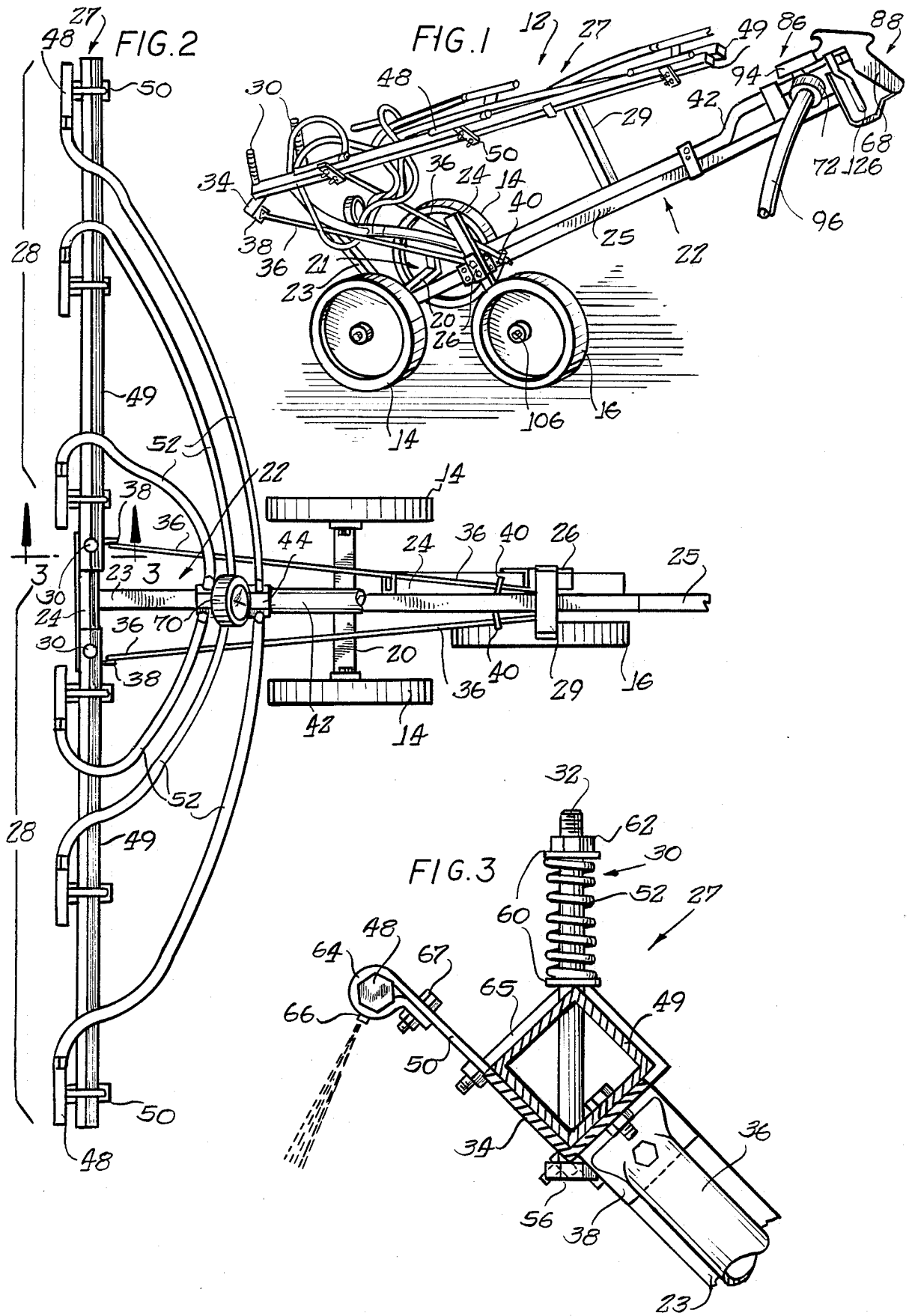

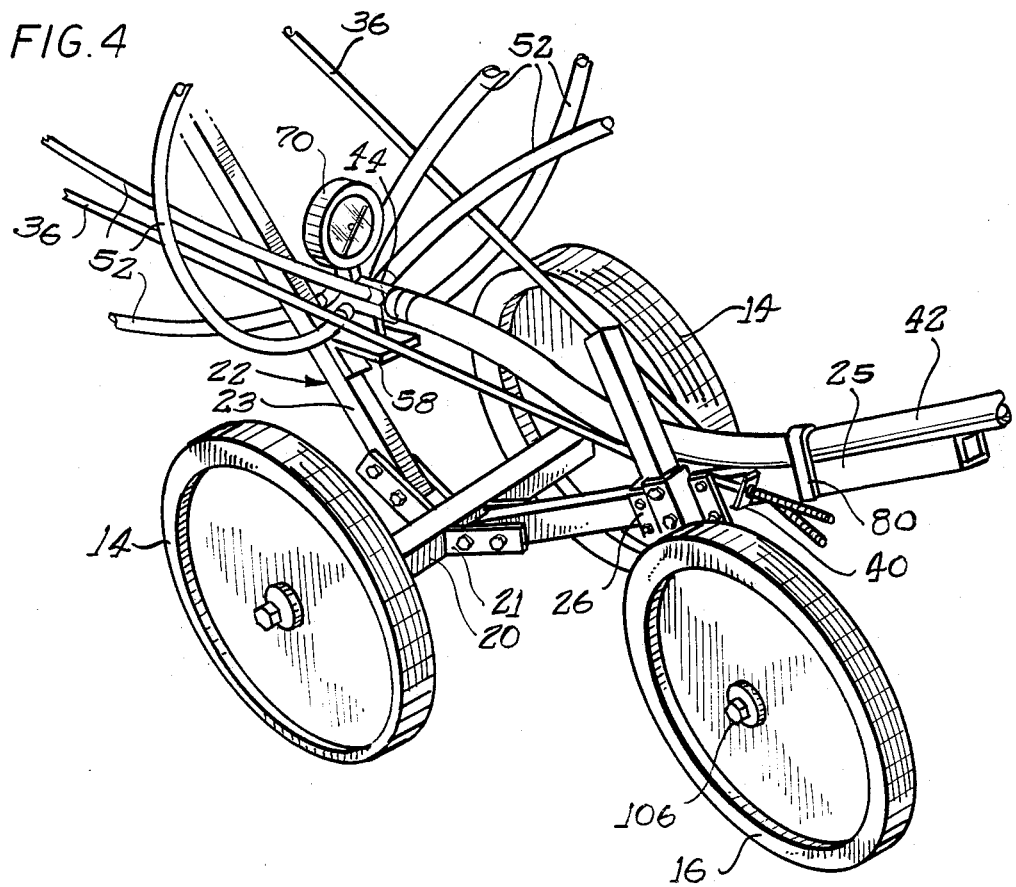
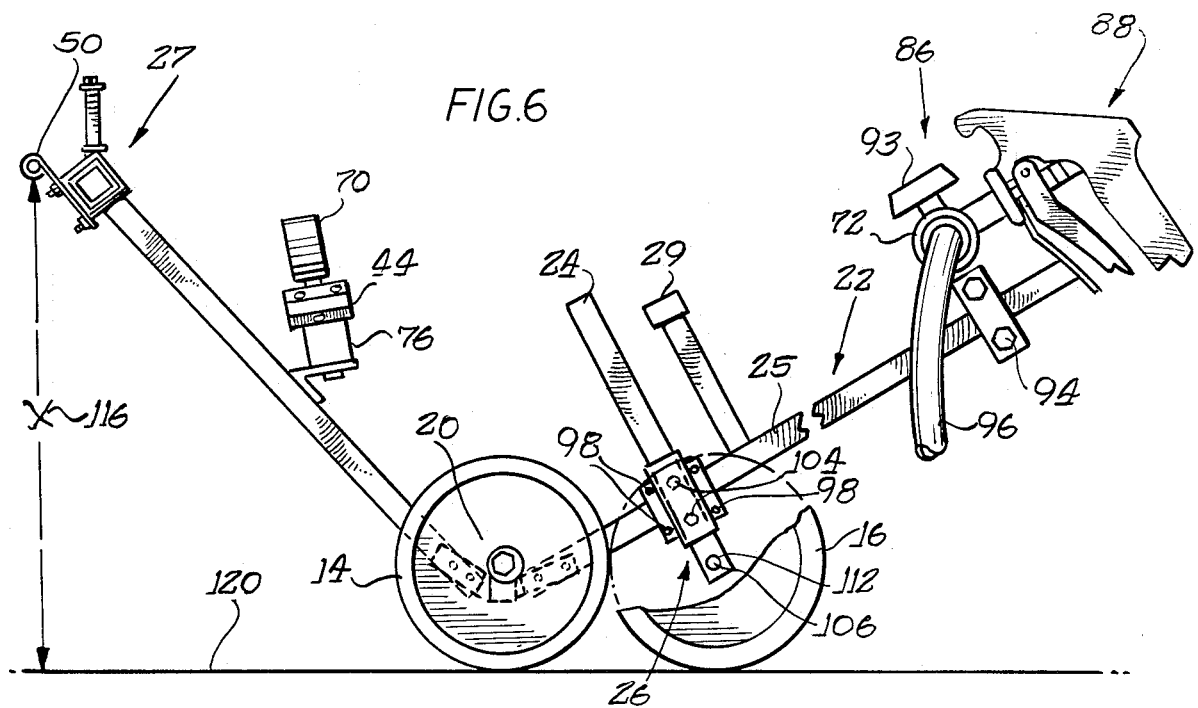

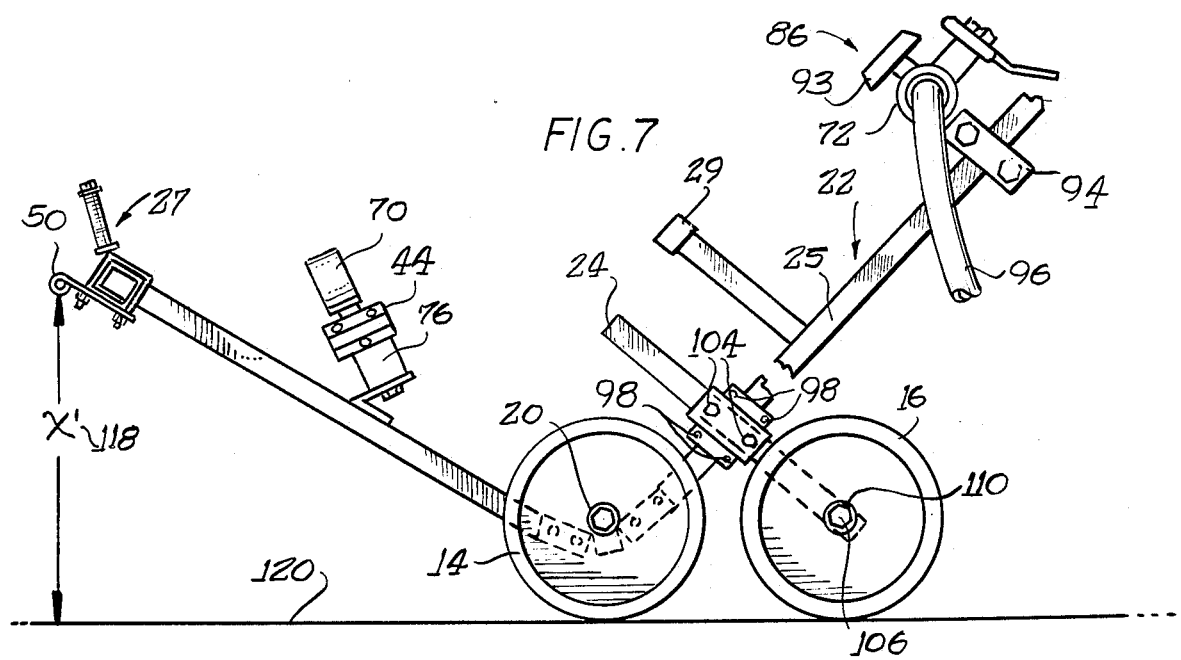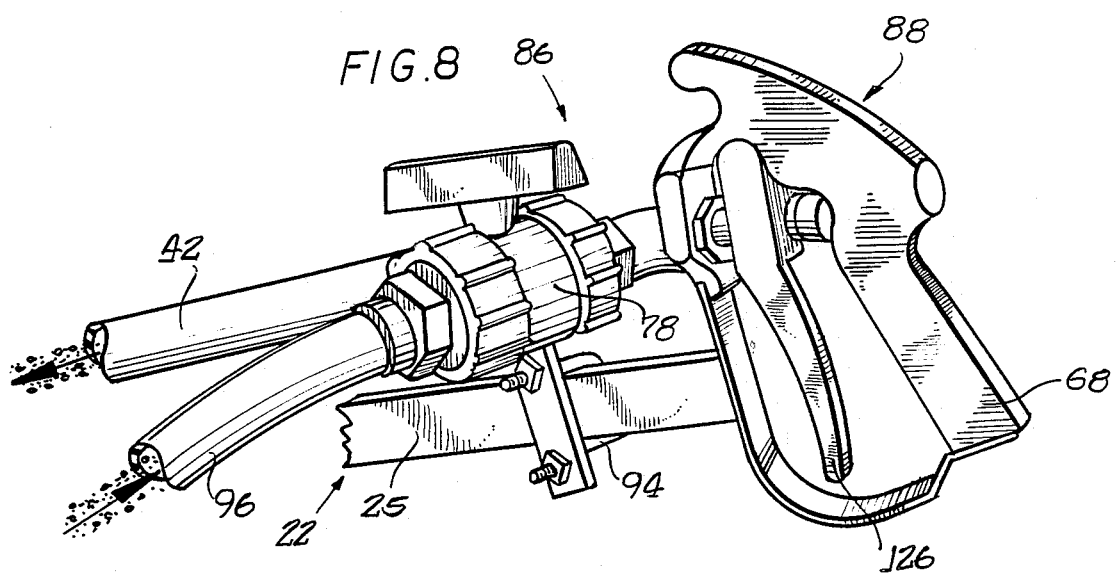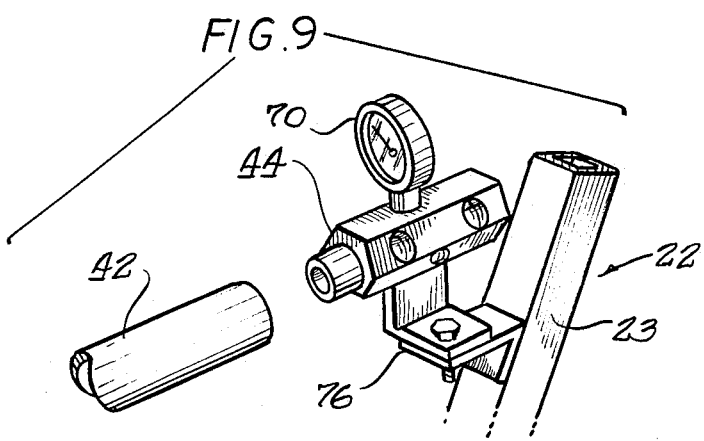

MOBILE MATERIAL DISTRIBUTION APPARATUS

BACKGROUND AND SUMMARY OF THE INVENTION

This invention relates to improvements in mobile material distribution apparatus such as those used in the spraying of fertilizers, weed killers, insecticides, or the like. While the invention may be useful in a wide variety of applications, the ensuing description will be facilitated by specific reference to hand-pushed mobile spray apparatus, and the problem of maintaining a uniform and selectable distribution rate of liquid in spray form over an area to be treated.

Many areas of agriculture apply materials such as fertilizers, weed killers and insecticides in a liquid form and distribute this liquid by spraying it over an area to be so treated using what is commonly known as a "sprayer". Typically, the liquid is pumped through hoses to multiple spray nozzles which are attached to an elongated bar or "boom". The boom permits the implementation of multiple nozzles to spray at higher rates over a larger area as the device is propelled along a given path of travel, thereby reducing the time required to spray a given total field area, making the operation more efficient. Large booms are often towed behind a tractor or similar vehicle, while smaller versions are hand-pushed by an operator.

Some of the hand operated sprayer applications include: spraying steep areas where a tractor is unable to operate safely; spraying delicate areas such as golf greens or newly planted areas where a tow vehicle could cause damage to the surface being sprayed; spraying areas which are inaccessible to a towing vehicle but which are for some reason large enough to require a boom sprayer to efficiently complete the spraying job, such as areas which are accessible only by narrow roads or trails; and/or areas which require tighter maneuvering than is possible with a tow vehicle. In the above situations the material to be sprayed is fed to the sprayer through a hose from a reservoir such as a towed tank trailer or the like.

Controlling distribution rates and spray patterns of these liquids is important. Controlling distribution rates and spray patterns improves the cost efficiency of the operation by avoiding spraying more or less liquid than is needed on a given area. For example, in spraying fertilizer on a grassy area such as a lawn or golf course, controlling the rate of distribution and spray pattern prevents killing the grass by spraying too much fertilizer and also prevents aesthetically offensive striping caused by fertilizer overlap.

In all the above-mentioned sorts of spraying operations, the nozzle spray pattern and position of the nozzle relative to the spray surface are important factors in applying the spray in a well-controlled manner. The nozzle spray pattern is normally controlled by selection of the type of nozzle to be used. However, control of the spray pattern also requires control of the position of the nozzle relative to the surface being sprayed, and this has caused many problems for prior art spraying systems.

A problem with many prior art spray systems is that they travel across the spray surface on two wheels mounted on a single axle. Two-wheeled apparatus tend to tip forward and backward about the axis of the axle, raising and lowering the spray nozzle throughout the spraying operation thus changing the spray pattern by changing the angle and height of the spray nozzles.

One prior art device recognized the problems caused by variations in spray boom height and the need to fixably raise or lower the spray boom. The prior art apparatus, the Walking Boom manufactured by FMC Agricultural Machinery Division, Jonesboro, Arkansas, provides a boom perpendicularly mounted to a tube structure which fits over a smaller diameter tube mounted to the axle of the apparatus. The larger tube is fitted with spring pins which lock into holes in the smaller diameter inner tube. While the structure of the apparatus provides adjustability of boom height, it is subject to the forward and backward tipping problem inherent in two-wheeled sprayers. Therefore, because of the tipping problem of the two-wheeled design, the adjustment feature does not solve the problem of maintaining a constant spray boom height above the spray surface. Another problem with such two-wheeled sprayers is that they do not easily track a consistent path. The two-wheel apparatus tends to "waddle" while being manually pushed, causing a wavy spray-distribution path. Waddling occurs when slightly greater force is applied to one side of the handle than the other, causing a faster rotation about one wheel than the other. When the rotation has progressed to a noticeable point, the operator usually compensates and turns the apparatus back on the desired path. Compensation usually results in over-compensation and waddling results. Waddling causes a wavy application of material and fatigues the operator more quickly than if he could maintain a more consistent spray path.

Yet another problem with the prior art apparatus is that the two-wheeled design is difficult to leave unattended or "parked". To park the two-wheeled apparatus the user has three choices: (1) rest the spray apparatus on the nozzles; (2) rest the spray apparatus on its handle; or (3) rest the spray apparatus against another fixed surface. Resting the spray apparatus on its nozzles or handle could easily result in damage to the apparatus and resting the sprayer on another surface is usually inconvenient, e.g. suitable surfaces are not always available.

Further, the inability of the prior art sprayer to stand unattended makes the sprayer difficult to erect after being stored. That is, many of the prior art units provide for foldable booms to make the units easier to store. However, the user must lean the apparatus against a fixed surface to unfold the booms and erect the apparatus. Since the two-wheeled unit is unstable, it could slip off the surface it is leaning against potentially resulting in damage to the unit.

OBJECTS OF THE INVENTION

A general object of the invention is to provide a mobile material distributing apparatus constructed for maintaining a substantially constant distance between distribution means and of the apparatus and the surface over which the material is distributed.

A more specific object of this invention is to provide a mobile apparatus which rides on three wheels, arranged with two wheels mounted transversely on a common axle member with the third wheel mounted offset from and generally centered between the other two. Preferably, the third wheel in this configuration is so mounted to the frame of the apparatus to permit adjustment of the third wheel in such a manner as to achieve height adjustment of the distribution means relative to the surface over which the material is to be distributed.

A further object of the invention is to provide an apparatus arranged to more accurately track a given path than was possible with the prior art apparatus.

A separate, but related object of the invention is to provide an apparatus of the above described type with an adjustable third wheel which further includes an adjustable handle which can be configured to provide maximum comfort and ease of operation while pushing the apparatus.

In accordance with the foregoing, the present invention comprises a mobile, hand-pushed boom-type spray apparatus which travels on three wheels. The apparatus is designed with folding booms and third wheel to facilitate compact storage. The third wheel helps maintain a constant spray boom height above the spray surface thereby increasing the precision of the spray application. The third wheel improves the ability of the apparatus to track a given path.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in which like reference numerals identify like elements, and in which:

FIG. 1 is an illustration of the three-wheeled sprayer of the present invention with two sections of boom folded in a compact storage configuration;

FIG. 2 is a top view of the three-wheeled sprayer with both boom sections extended;

FIG. 3 is an enlarged view of the cross-section of 3—3 of the distribution means of the three-wheeled sprayer as shown in FIG. 2;

FIG. 4 is an enlarged view of the three wheels as mounted to the frame means and the feed hose manifold assembly;

FIG. 6 is a side elevation of the three-wheeled sprayer with the third wheel retracted to raise the spray boom;

FIG. 7 is a side elevation of the three-wheeled sprayer with the third wheel extended to lower the spray boom;

FIG. 8 is an enlarged view of the fluid control means of the invention including the control handle assembly and the main control valve; and FIG. 9 is an enlarged view of the feed hose manifold as mounted to the frame means.

DETAILED DESCRIPTION OF THE ILLUSTRATED EMBODIMENT

Figure 5:
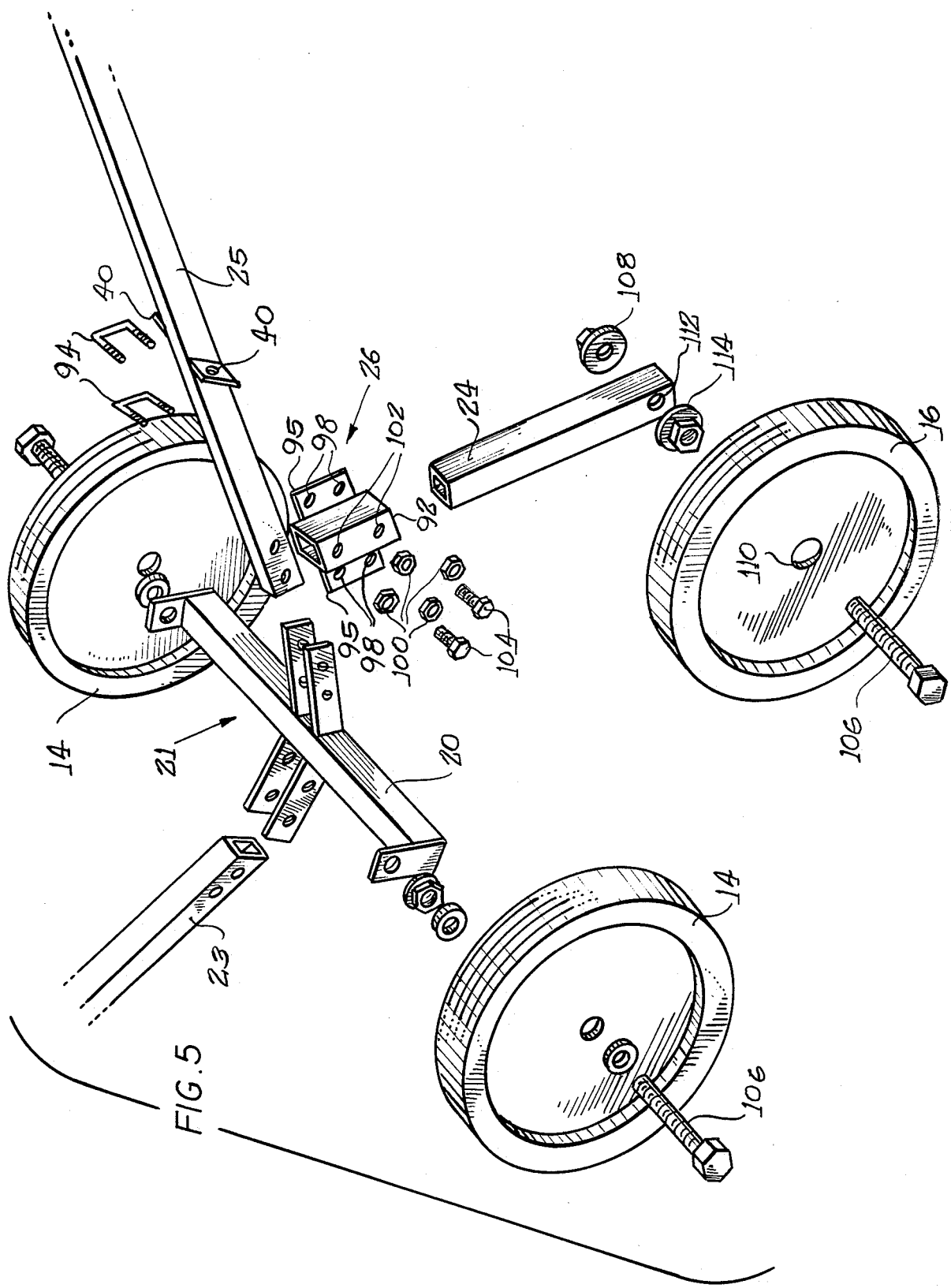
FIG. 5 is an enlarged fragmentary exploded view of the adjustment bar bracket, adjustment bar, and third wheel.

A preferred embodiment of a three-wheeled spraying apparatus 12 incorporating the present invention is shown in FIG. 1 in an unattended, self-supporting, folded compact storage configuration. The three-wheeled sprayer 12 is shown freely standing on primary ground engaging means or front wheel means 14, and a secondary ground engaging means or third wheel 16. These wheels 14,16 can be any type of material or design such as hard solid plastic or pneumatic tires. All three wheels need not be identical although the front wheels are typically matching. The front wheels 14 are attached to an axle member 20 which is connected to a junction of a generally V-shaped frame means 22 having a first portion in the form of an upwardly diverging forwardly extending leg 23 and a second portion in the form of a rearwardly extending leg. The axle 20 is mounted to the frame 22 substantially at its lower apex or the junction 21 between the legs 23 and 25. The third wheel 16 is attached to an adjustment bar 24 which is secured by an adjustment bar bracket 26 attached to the rearwardly extending leg 25 of the frame means 22.

Also shown in FIG. 1 is a material distribution means 27, comprised of a two-sectioned spray boom 28, shown in its folded configuration which is useful when storing the apparatus. In the folded configuration the spray booms 28 rest on a folded spray boom support 29 which is connected to the frame means 22. Spray booms 28 are opened from the folded position by pivoting the booms about a boom locking means 30 on a spring shaft 32.

FIG. 2 illustrates the spray booms 28 in the open, unfolded position with the open booms 28 locked open by the boom locking means 30 and supported by an open boom support 34. The open boom support 34 preferably comprises a V-shaped channel perpendicularly connected to an upper end or frame arm 23 and strengthened and stabilized by boom stabilizing rods 36 which attach to opposite ends of the boom support 34 by boom stabilizing brackets 38 and to the leg 25 of the frame means 22 by a bracket 40.

FIG. 2 also clearly illustrates a supply hose routing from a main feed hose 42 through a feed hose manifold 44 and to a spray nozzle array 46. The spray nozzle array comprises six nozzle fittings 48, each of which is attached to a boom bar 49 by an adjustable nozzle fitting bracket 50. Six corresponding nozzle feed hoses 52 distribute material from the manifold 44 to the six nozzle fittings 48. While the illustration in FIG. 2 shows six sets of nozzle fittings 48, nozzle fitting brackets 50 and nozzle feed hoses 52, it is apparent that the booms 28 may be outfitted with more or fewer such assemblies.

FIG. 3 is an enlarged view of section 3-3 of FIG. 2 and shows a cross-section of the distribution means 27. As shown in this cross-section, boom bar 49 is a hollow square tube which provides structural support and bracing for the attached nozzle fittings 48. The boom bar 49 is secured in the V-channel of the boom bar support 34 by the boom locking means 30.

The boom locking means 30 comprises a spring shaft 32 which passes up through a concentric hole in the open boom support 34 and the boom bar 49, and is stopped by a spring shaft head 56. On the top side of the boom bar 49 a locking spring 52 between two spring washers 60 fits over the exposed spring shaft 32 and is held in place by a nut 62. The locking spring 52 is compressed on the spring shaft 32 by adjustment of the nut 62 to create a suitable amount of compressive force to hold the boom bar 49 in the open boom support 34. This compressive force may be manually overcome when folding the distribution means 27 for storage of the apparatus 12 by lifting up on the boom bar 49 to disengage it from the V-channel of the open boom support 34 and pushing the bar towards the frame means 22.

Each spray nozzle fitting 48 is supported from the boom bar 49 by a nozzle fitting holder 64 of the nozzle fitting bracket 50, which is secured to the boom bar 49 by a mounting member or U-bolt 65. The nozzle fitting 48, to which a spray nozzle 66 is attached, is rotatably adjustable within the nozzle fitting holder 64 and is secured in a desired position by tightening a holder bolt 67 thereby tightening the nozzle fitting holder 64 about the fitting 48. Adjustment of the nozzle fitting 48 in this manner permits redirection of the spray from the spray nozzle 66. This adjustment is useful to redirect the spray after the height and angle of the booms 28 are changed by adjustment of the third wheel 16 as will be explained more fully hereinbelow.

As shown in FIGS. 4 and 9 the feed hose manifold 44, which distributes the spray material from the feed hose 42 to the spray nozzles 66 through the nozzle feed hoses 52, is mounted to the frame means 22 by a manifold bracket 58. Mounted to the feed hose manifold 44 is a flow gauge 70, which provides a reading of the material flow to the manifold 44 permitting an operator to adjust the material flow accordingly at a main control valve 72. Between the main control valve 72 and the feed hose manifold 44, the main feed hose 42 is secured to the frame means 22 by a main feed hose bracket 80.

FIG. 8 shows a material control means 86 comprising the main control valve 72 and a control handle assembly 88. The control handle assembly includes a grip 68 secured to the frame leg 25 which helps to steer the apparatus 12 while an operator pushes it. A trigger 126 is provided for controlling the valve 72, this trigger 126 is squeezed against the grip 68 to increase the material flow through the main control valve 72. Main control valve 72 is mounted to the frame means leg 25 by a valve bracket 94. A valve handle 93 on the main control valve 72 permits control of material flow through the main control valve 72. The arrows and representative material in FIG. 8 show the flow path into and out of the main control valve 72 through a hose 96 leading from a tank or other suitable source of supply, not shown, and the main feed hose 42, respectively.

FIG. 5 best shows the structure of the invention as used in the illustrated embodiment. As shown, the adjustment bar bracket 26 comprises bar holding means or sleeve 92 from each side of which projects flanges 95 and bracket members or U-bolts 94. The bracket members 94 project through holes 98 in the flanges 95. By attaching nuts 100 to the end of the bracket members 94 the adjustment bar bracket 26 is secured to the leg 25 of frame 22.

Two holes 102 with complementary threads for receiving set screws 104 are formed on a surface of the bar holding means 92, facing outwardly from the frame 22. When an adjustment bar 24 is inserted through the bar holding sleeve 92, the set screws 104 are tightened to engage and securely hold the adjustment bar 24 in the desired position.

As further shown in FIG. 5, the wheel 16 is attached to the adjustment bar 24 by a wheel bolt 106 and corresponding securing nut 108. The wheel bolt 106 is sufficiently long to extend through a hole 110 in the wheel 16 as well as a hole 112 in the adjustment bar 24. A washer bearing 114 which mounts in the wheel hole 110 between the wheel 16 and adjustment bar 24, fits over the wheel bolt 106 projecting through the wheel hole 110 to help the wheel 16 rotate more freely and maintain a space between the wheel 16 and bar 24.

FIGS. 6 and 7 show side elevations of the apparatus 12 with the adjustment bar bracket 26 and adjustment bar 24 in various positions of adjustment. It is to be noted that the axle of the wheels 14 provide an axis about which the frame 22 will pivot upon adjustment of the wheel 16. The spray nozzles 66 are offset substantially forwardly of the pivot axis so that pivotal movement of the frame 22 about the axle 20 will cause a change in height of the spray nozzles 66 above the ground 120. The wheel 16 is also substantially offset from the pivot axis to facilitate such adjustment. As shown in FIG. 6, the third wheel 16 and adjustment bar 24 are adjusted upwardly in the bar holding means 92 of the adjustment bracket 26. This adjustment pivots the frame 22 so that the control handle assembly 88 moves downwardly and the distribution means 27 moves upwardly about the axle member 20. The result of this adjustment is that a distance X (116) between the nozzle fitting 50 and the surface 120 is increased.

FIG. 7 illustrates the result of adjusting the adjustment bar bracket 26 and adjustment bar 24 starting from a position as shown in FIG. 6. To get from the FIG. 6 position to the FIG. 7 position, the set screws 104 are loosened, disengaging them from securely holding the adjustment bar 24 in the bar holding means 92. Once loosened, the adjustment bar 24 is free to slide upwardly or downwardly within the bar holding means 92. In FIG. 7 the adjustment bar 24 is extended downwardly in the bar holding means 92 causing the control handle assembly 88 to pivot upwardly and the distribution means 27 to pivot downwardly about the axle member 20. To secure this adjustment, the set screws 104 are tightened against the adjustment bar 24. The above adjustment changes the configuration as in FIG. 6, decreasing a distance X' (118) between the distribution means 27 and a spray surface 120 and correspondingly raising the control handle assembly 88.

Additionally, if necessary, the adjustment bar bracket 26 may be moved along the portion of the frame to which it attaches to gain further adjustments. Typically, this adjustment is not necessary since adjustment of the adjustment bar 24 within the bar holding means provides sufficient height adjustment of the distribution means 27 to achieve a desired spray pattern.

After adjusting the third wheel 16, further adjustments to the spray pattern and the handle assembly 88 can be made. The spray pattern of the spray nozzle 66 is dependent upon the height and angle of the nozzle relative to the spray surface 116. The adjustment of the third wheel 16 may result in the nozzles 66 being pointed in an undesirable direction. The nozzle fitting 48 can be rotated to the desired direction within the fitting holder 64 by loosening the holder bolt 67 and retightening it after adjustment. If, after adjusting the third wheel 16, the angle of the control handle assembly is uncomfortable to the user, the handle assembly 88 can be tilted by loosening a handle adjustment bolt 124. This adjustment is helpful when operating over a non-uniform surface in that they help to increase control of the apparatus, thereby helping to maintain the desired spray pattern over the surface 120.

The addition of the third wheel 16 further improves the stability and tracking and does not reduce maneuverability of the spray apparatus 12. With the three wheels always on the ground, the height of the spray nozzles is maintained substantially constant as compared with the variable positioning obtained with prior two wheeled units which depend upon an operator to manually hold the sprayer in a desired position. Thus it will be appreciated that the stability of the three-wheeled apparatus of the present invention, is markedly superior to that of a two-wheeled apparatus. In the three-wheeled apparatus of the invention, a portion of the weight of the apparatus 2 is transferred to the third wheel 16 through the adjustment bar bracket 26 and adjustment bar 24. Since the weight of the apparatus 12 may be generally distributed more evenly over the three wheels 14,16 the apparatus can be left unattended without having to lay the control handle 88 or the distribution means 27 on the surface 120.

Tracking is improved since the third wheel 16 prevents the apparatus 12 from waddling from side-to-side over the spray surface 120. Third wheel 16 prevents waddling by inhibiting rotation of the apparatus 12 about one front wheel 14 normal to the horizontal plane 120. While preventing waddling, the third wheel does not inhibit maneuverability. For tight turns, the user merely lifts up slightly on the control handle means 88, thus disengaging the third wheel 16 from the surface 120, thereby permitting rotation of the apparatus about one of the front wheels 14 normal to the horizontal plane 120.

In use, the operator removes the apparatus 12 from storage and positions the apparatus 12 to stand on all three wheels in a stable unattended position (see FIG. 1). The user next unfolds the distribution means 27 from the storage position by lifting the booms 28 off of the boom storage support 29 and rotating them outwardly. In the position perpendicular to the frame means 22, the booms 28 are locked into position in the open boom support 34 by the boom locking means 30 (see FIG. 2).

The third wheel 16 is adjusted by loosening the set screws 104 and/or the bracket members 94 and corresponding nuts 100. The third wheel 16 is then positioned relatively to the adjustment bar bracket 26 and/or the frame 22 to cause the distribution means 27 to be positioned at a desired height followed by tightening screws and/or bracket. The third wheel 16 may also be adjusted by use of the screws 104 and bracket nuts 100 independently of each other. For example, adjustment may be achieved by sliding the third wheel 16 and bracket 86, relative to frame means 22, in the horizontal direction, and tightening the bolts 114. Alternatively, adjustment may be made by sliding the third wheel 16 and the adjustment bar 24 in the vertical direction, and tightening the screws 104.

The user further prepares the sprayer 12 for spraying by opening the main control valve 72 to a desired pressure as read on the pressure gauge 70. Once the pressure is set, the user grasps the control handle assembly 88 at the grip 68 and pushes the apparatus to travel forward and causes the apparatus to spray by pulling the trigger 126.

Direction of the nozzle 66 may be adjusted by loosening the holder bolt 67 to loosen the nozzle fitting holder 64 and rotating the nozzle fitting 48 and the nozzle fitting holder 64 and retightening the holder bolt 67. Additionally, the control handle assembly 88 may be adjusted by loosening the handle adjustment bolt 124 and frame means 22, rotating the control handle assembly 88 about the bolt 124 to the desired position and retightening the bolt 124.

While particular embodiments of the invention have been shown and described, in detail, it will be obvious to those skilled in the art that changes and modifications of the present invention, in its various aspects, may be made without departing from the spirit and scope of the appended claims.

What is claimed is:

1. A manually movable spraying apparatus for generally uniformly distributing materials along a path of travel comprising: frame means; primary ground engaging means operatively attached to said frame means along a common axis supporting said frame means for providing mechanical advantage in moving said apparatus over a surface; spray nozzle means operatively attached to said frame means above said surface and substantially offset from said axis, pivotal movement of said frame means about said common axis causing a variation in height of said nozzle means above said surface; secondary ground engaging means adjustably attached to said frame means for providing a mechanical advantage in moving said apparatus and for resisting pivotal movement of said frame means about said axis for maintaining said nozzle means at a spaced apart distance from said surface while moving said apparatus and; adjustable mounting means adjustably attached to said frame means and to which said secondary ground engaging means is operatively attached for adjustably controlling the height of said spray nozzle means above said surface, said adjustable mounting means including an adjustment bar bracket selectively positionable along said frame means and an adjustment bar being adjustably attached to said frame by said adjustment bar bracket.

2. An apparatus according to claim 1 wherein said primary and secondary ground engaging means comprise wheel means.

3. An apparatus according to claim 1, wherein said adjustment bar bracket comprises: bar holding means adjustably attached to said frame means for holding said adjustment bar in a generally perpendicular orientation to said frame means; flange portions attached to said bar holding means, generally extending away from said bar holding means, said flange portions being formed with holes therethrough for receiving bracket members, and the bracket members formed for mating with a portion of said frame means, end of said bracket members being formed to project through said holes in said flanges and being threaded for receiving nuts thereon, whereby said bar holding means is releasably secured to said frame means by said flanges, brackets, and nuts.

4. A manually movable spraying apparatus for generally uniformly distributing materials along a predetermined path of travel over the ground comprising: frame means; an axle member operatively attached to said frame means; wheel means operatively attached to said axle for providing movable support of said apparatus above the ground; material distributing means attached to said frame means a predetermined distance from said wheel means; handle means attached to said frame means for transferring a force applied thereto to move said apparatus along said path of travel; secondary ground engagement means adjustably attached to said frame means for stabilizing the apparatus and maintaining a generally consistent distance between said distribution means and the ground over which said material is distributed substantially uniformly and for facilitating tracking of said predetermined path of travel by said apparatus; adjustable mounting means adjustably attached to said frame means and to which said secondary ground engaging means is operatively attached for adjustably controlling the height of said material distributing means above said surface, said adjustable mounting means including an adjustment bar bracket selectively positionable along said frame means and an adjustment bar being adjustably attached to said frame by said adjustment bar bracket; an portion of said adjustment bar bracket being formed with threaded holes therethrough for receiving set screws formed with complementary threads; and the set screws projecting through said threaded holes in said portion of said adjustment bar bracket for releasably engaging said adjustment bar when said adjustment bar is positioned in said adjustment bar bracket.

5. A manually movable spraying apparatus for generally uniformly applying materials to a surface along a specified path, said spraying apparatus comprising: frame means for providing structural extension and support to said spraying apparatus, said frame means having at least a first portion and a second portion generally attached at a junction, said first portion extending generally forwardly from said junction and said second portion extending generally rearwardly from said junction; primary grounding engaging means operatively attached to said frame means generally at said junction for providing mechanical advantage in moving said apparatus along said path of travel; spraying means attached to said first portion of said frame means generally spaced away a predetermined distance from said primary ground engaging means and being controllably adjustably spaced relative to said surface for applying said materials thereto; handle means operatively attached to said frame means and generally spaced apart from said primary ground engaging means and said spraying means for controllably exerting a force thereon for moving and directing said apparatus along said specified path; and secondary ground engaging means adjustably attached to said frame along said second portion and spaced apart from said primary ground engaging means substantially less than said predetermined distance for providing a mechanical advantage in moving said apparatus, facilitating positional adjustment of said spraying means relative to said surface and improving the ability to track said path of travel.

6. An apparatus according to claim 5 further including adjustable mounting means adjusting attached to said frame means, said secondary ground engaging means being operatively attached to said adjustable mounting means for adjustably controlling the distance of said spraying means relative to said surface.

7. An apparatus according to claim 6 wherein said secondary ground engaging means comprises a wheel operatively attached to said adjustable mounting means.

8. A manually movable spraying apparatus for generally uniformly applying material to a surface along a specified path, said spraying apparatus comprising a generally V-shaped frame means for providing structural extension and support to said spraying apparatus, said frame means having at least a first portion and a second portion generally attached at a junction, said first portion extending generally forwardly from said junction and said second portion extending generally rearwardly from said junction; primary ground engaging means operatively attached to said frame means generally at said junction for providing a mechanical advantage in moving said apparatus along said path of travel, said primary ground engaging means including an axle member operatively attached generally at said junction and two wheels rotatably attached thereto; material distributing means attached to said first portion of said frame means generally spaced away from said primary ground engaging means and being adjustably spaced relative to said surface for applying said materials thereto; handle means operatively attached to said frame means and generally spaced apart from said primary ground engaging means and said material distributing means for controllably exerting a force thereon for moving and directing said apparatus along said specified path; secondary ground engaging means adjustably attached to said frame along said second portion and spaced apart from said primary ground engaging means for providing a mechanical advantage in moving said apparatus, facilitating positionable adjustment of said material distributing means relative to said surface and improving the ability to track said path of travel, said secondary ground engaging means including adjustment means comprising an adjustment bar adjustably attached to and extending from said second portion and to which a wheel is rotatably attached, and an adjustment bar bracket adjustably attached to said second portion and attachable to said adjustment bar for adjustably attaching said wheel to said apparatus.

9. An apparatus according to claim 8, wherein said material distributing means comprises a spray bar which is operatively attachable to a suitable material delivery system.

* * * * *